(12) United States Patent
Watanabe

(10) Patent No.: US 8,442,364 B2
(45) Date of Patent: May 14, 2013

(54) OPTICAL WAVEGUIDE CIRCUIT AND MANUFACTURING METHOD OF OPTICAL WAVEGUIDE CIRCUIT

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 248 days.

(21) Appl. No.: 13/048,358

(22) Filed: Mar. 15, 2011

(65) Prior Publication Data

US 2011/0249937 A1   Oct. 13, 2011

(30) Foreign Application Priority Data

Apr. 9, 2010   (JP) .................................. 2010-90451

(51) Int. Cl.
*G02B 6/42* (2006.01)
*B32B 38/00* (2006.01)
*B32B 37/02* (2006.01)
*H01L 21/00* (2006.01)

(52) U.S. Cl.
USPC .................. 385/31; 385/14; 385/42; 385/45; 385/129; 385/130; 385/131; 385/132; 156/273.3; 438/29; 438/31

(58) Field of Classification Search ............... 385/14, 385/31, 42, 45, 129, 130, 131, 132; 438/29; 438/31; 156/273.3
See application file for complete search history.

(56) References Cited

U.S. PATENT DOCUMENTS

| 6,993,213 | B2 * | 1/2006 | Takagi ........................... 385/14 |
| 7,340,114 | B2 * | 3/2008 | Doi et al. ........................ 385/2 |
| 7,405,421 | B2 * | 7/2008 | Hashimoto et al. ............ 257/14 |
| 8,280,201 | B2 * | 10/2012 | Prosyk .............................. 385/3 |
| 2002/0015561 | A1 * | 2/2002 | Kawashima et al. ........... 385/42 |
| 2005/0175281 | A1 * | 8/2005 | Thapliya et al. ................ 385/28 |
| 2011/0249937 | A1 * | 10/2011 | Watanabe ........................ 385/31 |
| 2012/0093457 | A1 * | 4/2012 | Sakamaki et al. .............. 385/14 |

OTHER PUBLICATIONS

T. Hashimoto et al., "Dual polarization optical hybrid module using planar lightwave circuit", Proceedings of the 2009 IEICE Electronics Society Conference, Sep. 15-18, 2009, pp. 194.

* cited by examiner

*Primary Examiner* — Brian Healy

(57) ABSTRACT

An optical waveguide device includes an optical branch device for branching a first input light and outputting the branched first input light to a first and a second optical waveguides, another optical branch device, arranged between the first and the second optical waveguides, for branching a second input light and outputting the branched second input light to a third and a fourth optical waveguides, an optical coupler which couples the lights traveling along the first and the third optical waveguides, then branches the coupled lights, and outputs them; and another optical coupler which couples the lights traveling along the second and the fourth optical waveguides, then branches the coupled lights, and outputs them, wherein optical path lengths of either a pair of the first and the second optical waveguides or a pair of the third and the fourth optical waveguides are set to be equal.

7 Claims, 7 Drawing Sheets

OPTICAL WAVEGUIDE CIRCUIT AND MANUFACTURING METHOD OF OPTICAL WAVEGUIDE CIRCUIT

This application is based upon and claims the benefit of priority from Japanese Patent Application No. 2010-090451, filed on Apr. 9, 2010, the disclosure of which is incorporated herein in its entirety by reference.

TECHNICAL FIELD

The present invention relates to an optical waveguide circuit and, in particular, to an optical waveguide circuit which can control fluctuation of an optical path length.

BACKGROUND ART

In recent years, in ultrahigh-speed communication beyond 100 G bit/second, a communication technology by DP-QPSK (Dual Polarization Differential Quadrature Phase Shift Keying) excelling in wavelength utilization efficiency, receiving characteristics and dispersion compensation ability has been attracting attention. A receiver in a DP-QPSK method needs to have a function to separate a light signal into a TE (Transverse Electric) and a TM (Transverse Magnetic) polarization components, and a 90 degree optical hybrid function for retrieving phase information from these polarized light signals. This phase information consists of four values on an I-Q plane including Ip and In whose phases differ by $\pi$, and Qp and Qn having a phase delay of $\pi/2$ to Ip and In, respectively.

Because a planar lightwave circuit using an optical waveguide technology is dominant as a device which realizes the function of a receiver of such DP-QPSK method, development thereof has been advanced in recent years. An optical waveguide technology is a technology for forming an optical waveguide of various shapes on a substrate using the same micro fabrication technologies as semiconductor integrated circuit manufacturing process, and it is suited to integration and mass production.

For example, in a related art document (Toshikazu Hashimoto, et al., "Dual polarization optical hybrid module using planar lightwave circuit", Proceedings of the 2009 IEICE Electronics Society Conference 1, Sep. 15, 2009, p. 194), a lightwave circuit structure shown in FIG. 6 is disclosed. This lightwave circuit has a general lightwave circuit structure in which the polarization splitting function and the 90 degree optical hybrid function which have been mentioned above are integrated on a planar optical circuit. FIG. 7 indicates the structure of the planar optical circuit for the TE light signal in the 90 degree optical hybrid as a schematic diagram.

In FIG. 7, optical branch devices 16 and 17, optical waveguide arms 18-21, and optical couplers 22 and 23 having two inputs and two outputs are indicated. Arms 18-21 constitute an interferometer. Lengths for the arms 18-20 are the same. Length of the arm 21 is longer than those of the other arms by one-fourth of the transmitted light wavelength traveling along the optical waveguide, so that a phase of light traveling along the arm 21 is delayed. Using this configuration, four values of phase information on the I-Q plane are outputted from optical couplers 22 and 23, and thus the above-mentioned 90 degree optical hybrid function is realized.

SUMMARY

An exemplary object of the present invention is to provide an optical waveguide circuit and a manufacturing method of an optical waveguide circuit which enable each optical waveguide arm constituting an interferometer to be produced with suppression of the fluctuation in the optical path length.

An optical waveguide device according to an exemplary aspect of the invention includes a first optical branch device for branching a first input light and outputting the branched first input light to a first and a second optical waveguides, a second optical branch device, arranged between the first and the second optical waveguides, for branching a second input light and outputting the branched second input light to a third and a fourth optical waveguides, a first optical coupler which couples the lights traveling along the first and the third optical waveguides, then branches the lights, and outputs the lights, and a second optical coupler which couples the lights traveling along the second and the fourth optical waveguides, then branches the lights, and outputs the lights, wherein optical path lengths of either a pair of the first and the second optical waveguide or a pair of the third and the fourth optical waveguide are set to be equal.

And an optical waveguide device manufacturing method according to another exemplary aspect of the invention includes forming a first clad layer on a substrate, laminating a core layer on the first clad layer, patterning the core layer to form a core, and covering the core with a second clad layer having a refractive index identical with the first clad layer, wherein a mask pattern used in patterning of the core layer configures a first optical branch device for branching a first input light and outputs the branched first input light to a first and a second optical waveguides a second optical branch device, arranged between the first and the second optical waveguides, for branching a second input light and outputs the branched second input light to a third and a fourth optical waveguides, a first optical coupler which couples the lights traveling along the first and the third optical waveguides, then branches the lights, and outputs the lights and a second optical coupler which couples the lights traveling along the second and the fourth optical waveguides, then branches the lights, and outputs the lights, wherein optical path lengths of either a pair of the first and the second optical waveguides or a pair of the third and the fourth optical waveguide are set to be equal.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, exemplary embodiments of the present invention will be described with reference to drawings.
(The First Embodiment)

Figure 1:
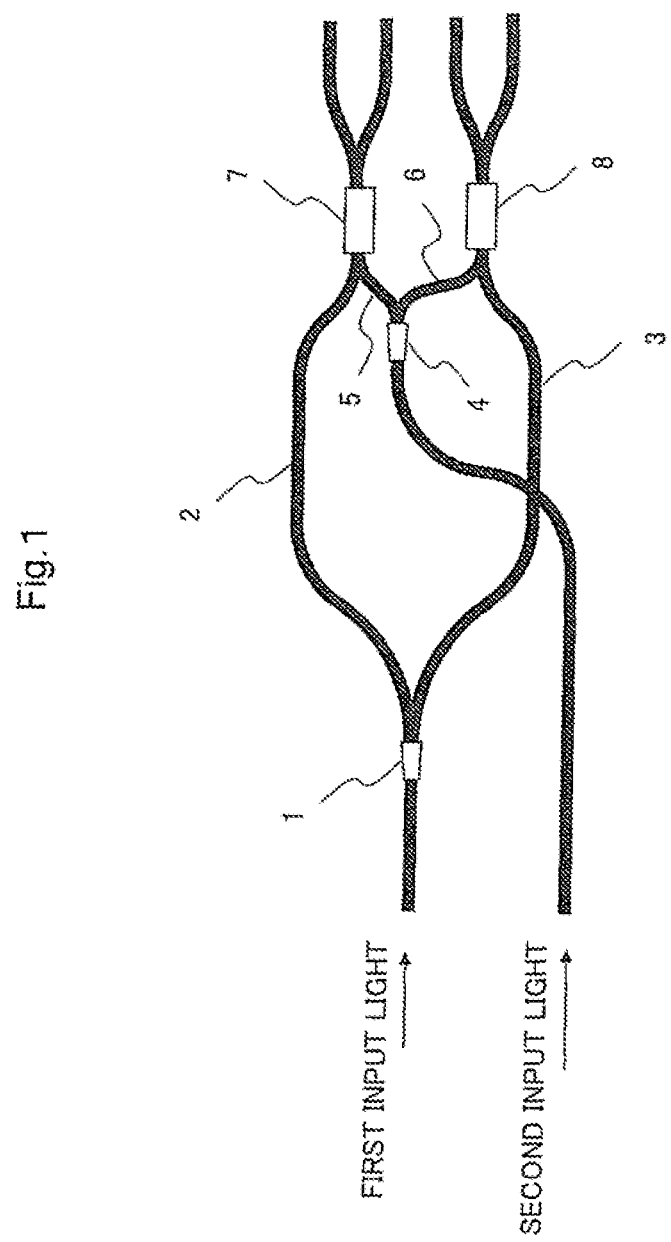
FIG. 1 is a pattern diagram showing a structure of an optical waveguide circuit of a first embodiment of the present invention.

FIG. 1 is a pattern diagram of an optical waveguide circuit which indicates an embodiment of the present invention. In FIG. 1, an optical branch device 1 branches the first input light and outputs the branched light to optical waveguides 2 and 3. An optical branch device 4 is arranged between optical waveguides 2 and 3, and branches the second input light and outputs the branched light to optical waveguides 5 and 6.

An optical coupler 7 couples the lights traveling along optical waveguides 2 and 5, then branches these lights, and outputs them. And an optical coupler 8 couples the lights traveling along optical waveguides 3 and 6, then branches these lights, and outputs them.

And, optical path lengths of either a pair of optical waveguides 2 and 3 or a pair of optical waveguides 5 and 6 are set to be equivalent. In FIG. 1, optical waveguides 2 and 3 have an equal optical path length, and, on the other hand, optical waveguides 5 and 6 have different optical path lengths.

Figure 7:
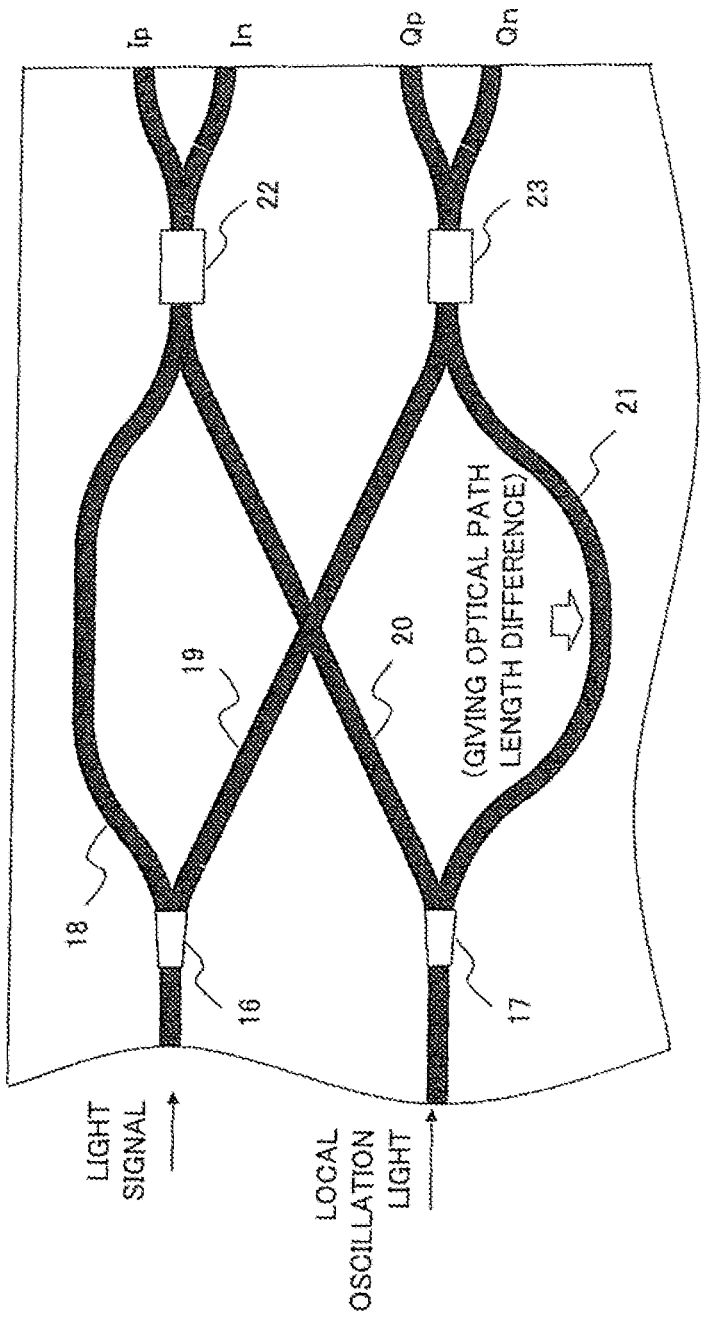
FIG. 7 is a pattern diagram showing a structure of the portion of a 90-degree optical hybrid interferometer in a receiver of a DP-QPSK method shown in FIG. 6.

When an interferometer is configured by the above mentioned optical waveguide circuit, because the optical waveguides 5 and 6 are branched just before the optical couplers 7 and 8, each of their lengths can be made very short compared with an interferometer of the structure as shown in FIG. 7. In addition, because the optical waveguides 5 and 6 become shorter, the size of the whole optical waveguide circuit can be also made small.

As mentioned above, because the length of an optical waveguide can be made short substantially in this embodiment, influence of factors that cause fluctuation of an optical path length such as patterning accuracy, fluctuation of refractive index, a stress formed between films or between a film and the substrate and transformation of an optical waveguide core can be reduced effectively. Accordingly, it is possible to produce each optical waveguide constituting an interferometer with suppression of the fluctuation in the optical path length.
(The Second Embodiment)

Figure 2:
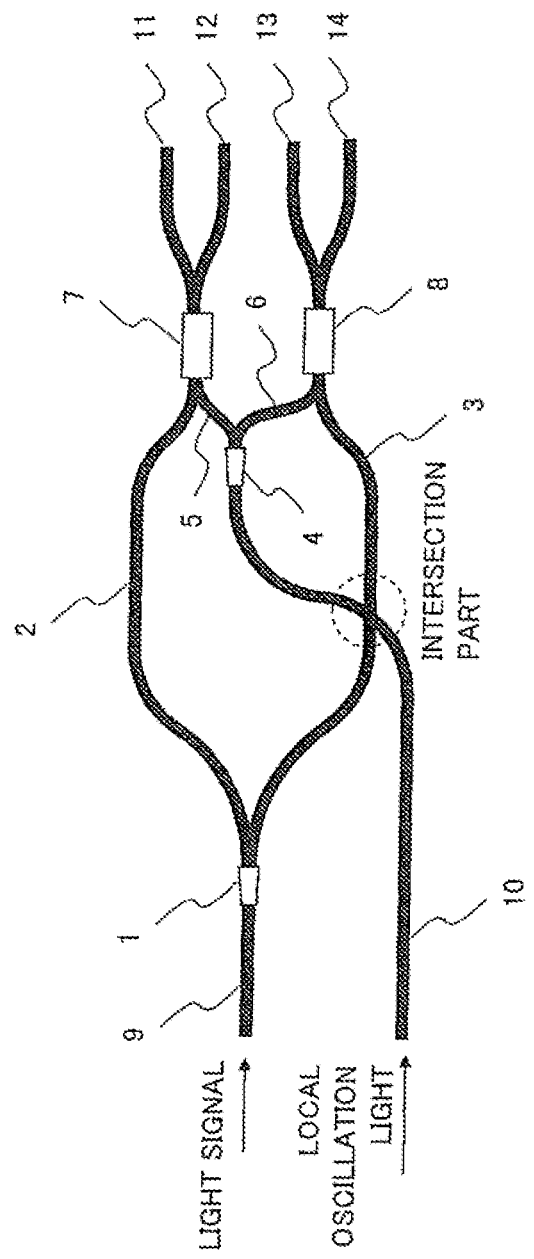
FIG. 2 is a pattern diagram showing a structure of a 90-degree optical hybrid interferometer of a second embodiment of the present invention.

FIG. 2 is a pattern diagram showing a 90-degree optical hybrid interferometer of the second embodiment of the present invention. In FIG. 2, components in common with those of FIG. 1 are denoted by the same symbols.

In FIG. 2, an optical signal is inputted to an input optical waveguide 9 and local oscillation light is inputted to an input optical waveguide 10. Then, an optical signal which travels along the input optical waveguide 9 is branched to the optical waveguides 2 and 3 by the optical branch device 1. On the other hand, the input optical waveguide 10 intersects with the optical waveguides 3, and local oscillation light which travels along the input optical waveguide 10 is branched by the optical branch device 4 arranged between the optical waveguides 2 and 3 to the optical waveguides 5 and 6. An optical signal and local oscillation light which travel along the optical waveguides 2 and 5, respectively, are combined in the optical coupler 7 having two inputs and two outputs, and an optical signal and local oscillation light which travel along the optical waveguides 3 and 6, respectively, are combined in the optical coupler 8 having two inputs and two outputs. A pair of output lights outputted from each of the optical couplers 7 and 8 travel along optical waveguides 11-14 and outputted to outside. Here, the optical waveguides 2 and 3 have an equal optical path length. On the other hand, optical path of the optical waveguide 6 is longer than that of waveguide 5 by $\lambda/(4n)$, where $\lambda$ is the wavelength of the optical signal and n is the equivalent refractive index of the optical waveguide.

Figure 3A:
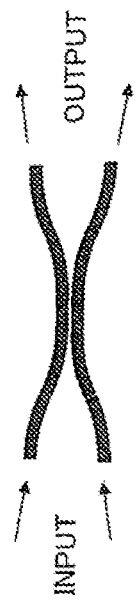
FIG. 3A is a pattern diagram showing a structure of a directional coupler as an optical coupler used in the present invention.
Figure 3B:
FIG. 3B is a pattern diagram showing a structure of a Mach-Zehnder interferometer as an optical coupler used in the present invention.
Figure 3C:
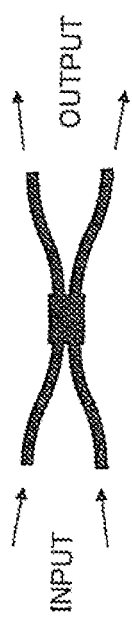
FIG. 3C is a pattern diagram showing a structure of a multimode interferometer as an optical coupler used in the present invention.

As the optical couplers 7 and 8, a directional coupler which is a general optical coupler having two inputs and two outputs as shown in FIG. 3A can be used. Also, a Mach-Zehnder interferometer as shown in FIG. 3B or a multimode interferometer as shown in FIG. 3C may be used as any one of the optical couplers. A Mach-Zehnder interferometer and a multimode interferometer have an advantage that, even if their optical coupling coefficients deviate from a design value because of a problem of processing accuracy or the like, influence of the fluctuation on its characteristics can be suppressed compared with a directional coupler.

The size of a thus configured 90-degree optical hybrid interferometer can be decided as follows. First, the output optical waveguides 11-14 need to be arranged at intervals that do not cause optical coupling each other. Assuming that the relative refractive index difference between a core and a clad of which an optical waveguide is 1.5%, for example, the parallel parts of the output optical waveguides 11-14 are arranged in an interval of not less than 10 μm. Once the intervals of the output optical waveguides 11-14 are decided, the interval between the optical couplers 7 and 8 is determined. Also, the optical waveguides 5 and 6 can be laid out with the length of each curved section and the straight section of the waveguides being adjusted so that the waveguides may have a predetermined optical path length difference. Spots of the waveguide of the optical branch device 4 needs to be broadened gradually before light is dichotomized, and thus a certain degree of length is needed. When the width of an optical waveguide core is 4 μm, for example, the length of the optical branch device is set to 540 μm. The interval of the parallel parts of the optical waveguides 2 and 3 is decided by the interval of the optical couplers 7 and 8 and the layout of the optical waveguides 5 and 6. The lengths of the optical waveguides 2 and 3 are decided by the interval between them and the widths that the optical waveguides 5 and 6 and the optical branch device 4 occupy between them.

The lengths of the optical waveguides 5 and 6 can be suppressed to tens of μm at most with the above 90-degree optical hybrid interferometer structure. Usually, in a case of a 90-degree optical hybrid interferometer of a structure as shown in FIG. 7, the length of each optical waveguide arm extends to several mm. According to this embodiment, it is possible to configure a 90-degree optical hybrid interferometer in which the length of each optical waveguide arm is reduced substantially, and, as a result, suppression of fluctuation of an optical path length becomes easy. In addition, the present embodiment can contribute to miniaturization of a whole 90-degree optical hybrid interferometer.

Meanwhile, an optical waveguide of the above mentioned structure can be produced by applying fine processing technologies used in a general semiconductor manufacturing process. For example, after forming a silicon oxide film of a low refractive index which becomes a lower clad layer on a silicon substrate by 10 μm of thickness using a chemical vapor deposition method, a silicon oxide film of a high refractive index which becomes a core layer is laminated by 4 μm of thickness.

After that, this core layer is patterned as an optical waveguide core of 4 μm width by a photolithographic method using a photomask having a pattern of a predetermined waveguide shape mentioned above. Further, by laminating a silicon oxide film of a low refractive index which becomes an upper clad layer by 10 μm of thickness to cover the above-mentioned optical waveguide core, we can configure a predetermined optical waveguide. The refractive index of a silicon oxide film can be adjusted arbitrarily by a dope amount of phosphorus and boron.

(The Third Embodiment)

Figure 4:
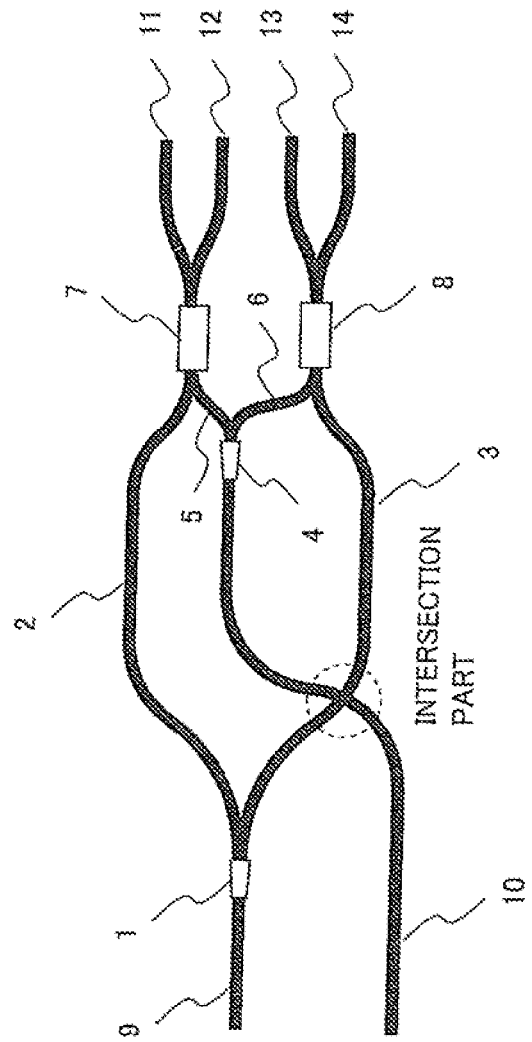
FIG. 4 is a pattern diagram showing a structure of an optical waveguide circuit of a third embodiment of the present invention.

FIG. 4 is a pattern diagram showing the third embodiment of the present invention. As shown in FIG. 2, in the second embodiment of the present invention, the input optical waveguide 10 has a part which intersects with the optical waveguide 3. In this intersection part, in order to prevent an excess loss, as well as a cross talk that is a phenomenon of light coupling to another waveguides which should not be coupled, the crossing angle needs to be designed to be close to perpendicular as much as possible. Here, when the input optical waveguide 10 intersects at a straight section of the optical waveguide 3 as shown in FIG. 2, if the whole optical waveguide circuit is not large, enough crossing angle may not be obtained. Accordingly, in the third embodiment of the present invention, the input optical waveguide 10 intersects at a curved part of the optical waveguide 3 as shown in FIG. 4. By making the input optical waveguide 10 and the optical waveguide 3 intersect as above, enough crossing angle is obtained easily.

As mentioned above, according to the third embodiment, it is possible to make the input optical waveguide 10 and the optical waveguide 3 intersect with a sufficiently large angle which does not cause a cross talk and an excess loss without expanding the size of the whole optical waveguide circuit.

(The Fourth Embodiment)

Figure 5:
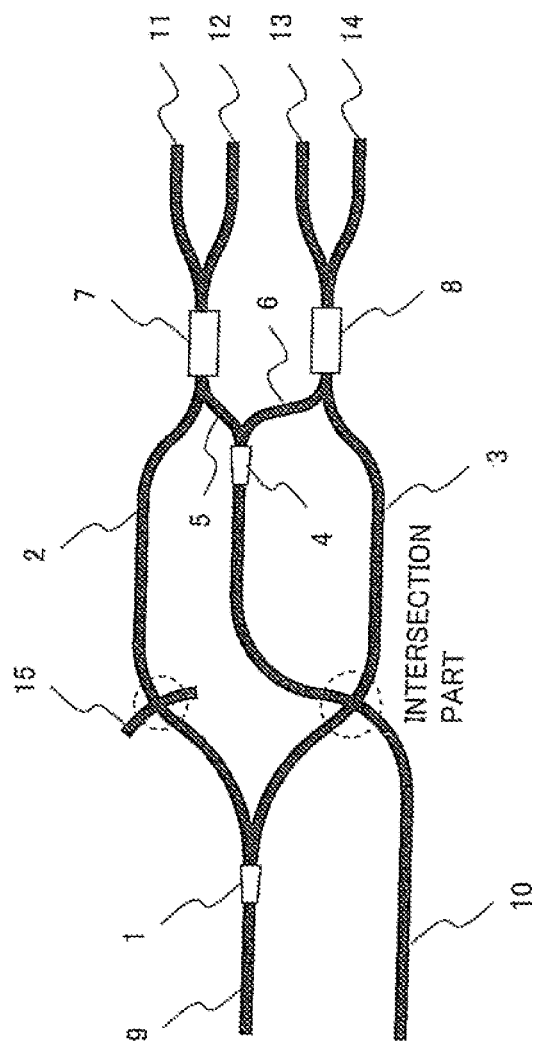
FIG. 5 is a pattern diagram showing a structure of an optical waveguide circuit of a fourth embodiment of the present invention.
Figure 6:
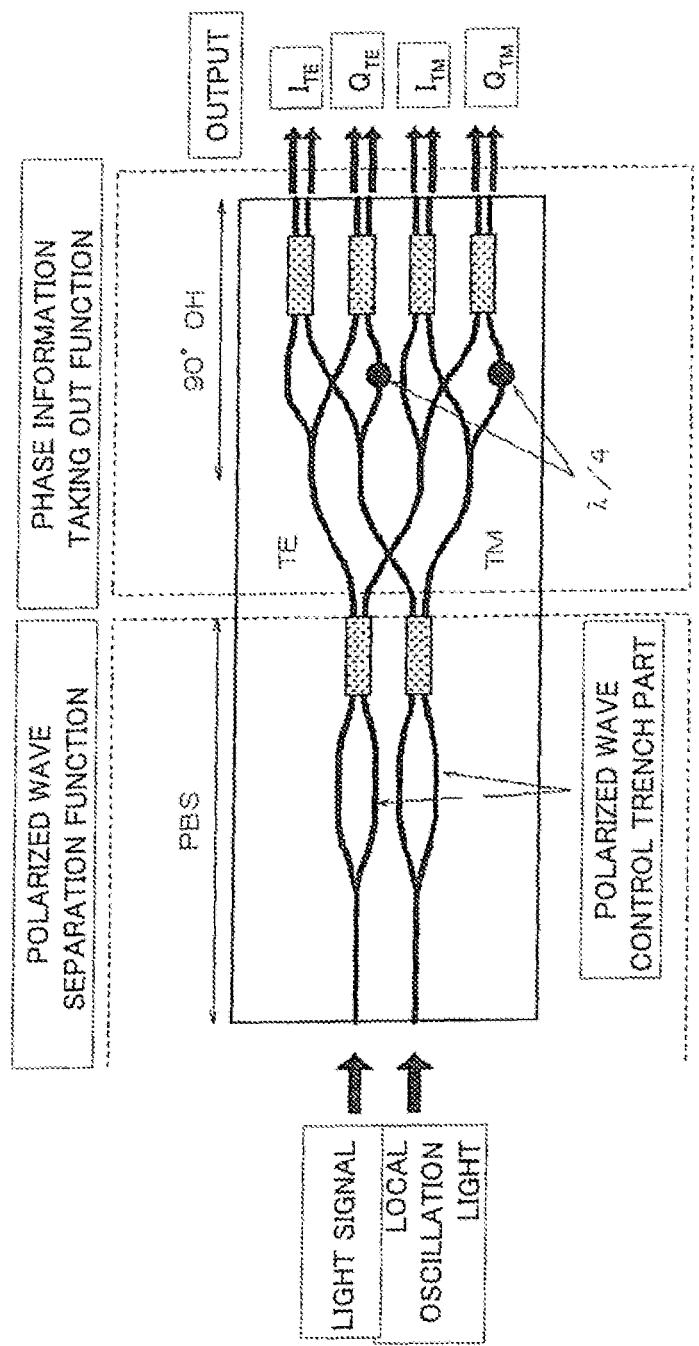
FIG. 6 is a pattern diagram showing an example of a structure of a receiver of a general DP-QPSK method.

FIG. 5 is a pattern diagram showing the fourth embodiment of the present invention. Here, in the optical waveguide 2, a dummy waveguide 15 which has a symmetrical shape to the intersection part of the optical waveguide 3 and the input waveguide 10 is provided.

According to the fourth embodiment, even when a change has occurred to the optical path length of optical waveguides by the intersection portion, because there are similar changes in the two optical waveguides, the optical path length difference between two optical waveguide arms does not change basically. Also, when a design parameter needs to be corrected, because the intersection parts of both of the optical waveguides have a symmetrical shape, only similar correction is required, and thus time for the analysis and the design can be saved substantially.

The whole or part of the exemplary embodiments disclosed above can be described as, but not limited to, the following supplementary notes.

(Supplement 1)

An optical waveguide circuit, comprising: a first optical branch device for branching a first input light and outputting said branched first input light to a first and a second optical waveguides;

a second optical branch device, arranged between said first and said second optical waveguide, for branching a second input light and outputting said branched second input light to a third and a fourth optical waveguides;

a first optical coupler which couples the lights traveling along said first and said third optical waveguides, then branches said lights, and outputs said lights; and a second optical coupler which couples the lights traveling along said second and said fourth optical waveguides, then branches said lights, and outputs said lights, wherein optical path lengths of either a pair of said first and said second optical waveguide or a pair of said third and said fourth optical waveguide are set to be equal.

(Supplement 2)

The optical waveguide circuit according to supplement 1, wherein an optical waveguide for transmitting said second input light intersects with either said first or said second optical waveguide.

(Supplement 3)

The optical waveguide circuit according to supplement 1, wherein said optical waveguide for transmitting said second input light intersects at a curved part of either said first or said second optical waveguide.

(Supplement 4)

The optical waveguide circuit according to any one of supplement 1 to supplement 3, wherein a Mach-Zehnder interferometer is used as at least one of said first and said second optical coupler.

(Supplement 5)

The optical waveguide circuit according to any one of supplement 1 to supplement 3, wherein a multimode interferometer is used as at least one of said first and said second optical coupler.

(Supplement 6)

The optical waveguide circuit according to any one of supplement 2 to supplement 5, wherein a dummy waveguide intersects with one of said first and said second optical waveguide which does not intersect with an optical waveguide for transmitting said second input light is provided.

(Supplement 7)

A manufacturing method of an optical waveguide circuit, comprising:

forming a first clad layer on a substrate;

laminating a core layer on said first clad layer;

patterning said core layer to form a core; and covering said core with a second clad layer having a refractive index identical with said first clad layer, wherein a mask pattern used in patterning of said core layer configures:

a first optical branch, device for branching a first input light and outputs said branched first input light to a first and a second optical waveguides;

a second optical branch device, arranged between said first and said second optical waveguides, for branching a second input light and outputs said branched second input light to a third and a fourth optical waveguides;

a first optical coupler which couples the lights traveling along said first and said third optical waveguides, then branches said lights, and outputs said lights; and a second optical coupler which couples the lights traveling along said second and said fourth optical waveguides, then branches said lights, and outputs said lights, wherein optical path lengths of either a pair of said first and said second optical waveguides or a pair of said third and said fourth optical waveguide are set to be equal.

(Supplement 8)

The manufacturing method of an optical waveguide circuit according to supplement 7, wherein a mask pattern used in patterning of said core layer configures an optical waveguide for transmitting said second input light intersects with either said first or said second optical waveguide.

(Supplement 9)

The manufacturing method of an optical waveguide circuit according to supplement 8, wherein a mask pattern used in patterning of said core layer configures said optical waveguide for transmitting said second input light intersects at a curved part of either said first or said second optical waveguide.

(Supplement 10)

The manufacturing method of an optical waveguide circuit according to any one of supplement 7 to supplement 9, wherein a mask pattern used in patterning of said core layer configures a Mach-Zehnder interferometer which is used as at least one of said first and said second optical coupler.

(Supplement 11)

The manufacturing method of an optical waveguide circuit according to any one of supplement 7 to Supplement 9, wherein a mask pattern used in patterning of said core layer configures a multimode interferometer which is used as at least one of said first and said second optical coupler.

(Supplement 12)

The manufacturing method of an optical waveguide circuit according to any one of supplement 7 to supplement 9, wherein a mask pattern used in patterning of said core layer configures a dummy waveguide intersects with one of said first and said second optical waveguide not intersecting with an optical waveguide for transmitting said second input light is provided.

In the above-mentioned 90-degree optical hybrid interferometer, in order to suppress fluctuation of characteristics, the optical path length difference between optical waveguide arms which form a pair needs to be controlled strictly. However, because, in a 90-degree optical hybrid interferometer, the shape and the layout of optical waveguide circuit for realizing its function are complicated, there is a problem that it is difficult to control optical path lengths of respective waveguide arms when manufacturing. That is, even if the length of each optical waveguide arm is adjusted correctly on a photomask, an optical path length difference fluctuates by various factors on processes such as patterning accuracy, fluctuation of a refractive index, a stress generated between films or between a film and a substrate, and deformation of an optical waveguide core. As a result, because characteristics as a 90-degree optical hybrid interferometer may deviate from an allowable range, an enough manufacturing yield cannot be obtained.

In contrast, an example of the effect of the present invention is to provide an optical waveguide circuit and a manufacturing method of an optical waveguide circuit which enable each optical waveguide arm constituting an interferometer to be produced with suppression of the fluctuation in the optical path length.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An optical waveguide circuit, comprising:
   a first optical branch device for branching a first input light and outputting said branched first input light to a first and a second optical waveguides;
   a second optical branch device, arranged between said first and said second optical waveguide, for branching a second input light and outputting said branched second input light to a third and a fourth optical waveguides;
   a first optical coupler which couples the lights traveling along said first and said third optical waveguides, then branches said lights, and outputs said lights; and
   a second optical coupler which couples the lights traveling along said second and said fourth optical waveguides, then branches said lights, and outputs said lights, wherein
   optical path lengths of either a pair of said first and said second optical waveguides or a pair of said third and said fourth optical waveguide are set to be equal.

2. The optical waveguide circuit according to claim 1, wherein an optical waveguide for transmitting said second input light intersects with either one of said first or said second optical waveguide.

3. The optical waveguide circuit according to claim 1, wherein said optical waveguide for transmitting said second input light intersects at a curved part of either said first or said second optical waveguide.

4. The optical waveguide circuit according to claim 1, wherein a Mach-Zehnder interferometer is used as at least one of said first and said second optical coupler.

5. The optical waveguide circuit according to claim 1, wherein a multimode interferometer is used as at least one of said first and said second optical coupler.

6. The optical waveguide circuit according to claim 2, wherein a dummy waveguide intersects with one of said first and said second optical waveguide which does not intersect with an optical waveguide for transmitting said second input light is provided.

7. A manufacturing method of an optical waveguide circuit, comprising:
   forming a first clad layer on a substrate;
   laminating a core layer on said first clad layer;
   patterning said core layer to form a core; and
   covering said core with a second clad layer having a refractive index identical with said first clad layer, wherein
   a mask pattern used in patterning of said core layer configures:
   a first optical branch device for branching a first input light and outputs said branched first input light to a first and a second optical waveguides;
   a second optical branch device, arranged between said first and said second optical waveguides, for branching a second input light and outputs said branched second input light to a third and a fourth optical waveguides;
   a first optical coupler which couples the lights traveling along said first and said third optical waveguides, then branches said lights, and outputs said lights; and
   a second optical coupler which couples the lights traveling along said second and said fourth optical waveguides, then branches said lights, and
   outputs said lights, wherein optical path lengths of either a pair of said first and said second optical waveguides or a pair of said third and said fourth optical waveguide are set to be equal.

* * * * *